United States Patent [19]

Feeney et al.

[11] Patent Number: 5,901,291
[45] Date of Patent: May 4, 1999

[54] METHOD AND APPARATUS FOR MAINTAINING MESSAGE ORDER IN MULTI-USER FIFO STACKS

[75] Inventors: James William Feeney, Endicott; Howard Thomas Olnowich; George William Wilhelm, Jr., both of Endwell, all of N.Y.

[73] Assignee: International Business Machines Corporation, Armonk, N.Y.

[21] Appl. No.: 08/731,809

[22] Filed: Oct. 21, 1996

[51] Int. Cl.[6] .................................................. G06F 13/00
[52] U.S. Cl. .............................. 395/200.83; 395/200.75; 370/409; 370/85.1
[58] Field of Search .............................. 395/800.14, 306, 395/200.83, 200.75; 364/200; 370/85.1, 85, 409

[56] References Cited

U.S. PATENT DOCUMENTS

| | | | |
|---|---|---|---|
| 4,155,117 | 5/1979 | Mitchell, Jr. et al. | 364/200 |
| 4,276,594 | 6/1981 | Morley . | |
| 4,703,364 | 10/1987 | Asada et al. . | |
| 4,748,617 | 5/1988 | Drewlo | 370/85 |
| 4,866,597 | 9/1989 | Kinoshita . | |
| 4,912,632 | 3/1990 | Gach et al. . | |
| 5,043,981 | 8/1991 | Firzoomand et al. | 370/85.1 |
| 5,111,425 | 5/1992 | Takeuchi et al. | 395/425 |
| 5,136,701 | 8/1992 | Kawai et al. | 395/425 |
| 5,155,830 | 10/1992 | Kurashige | 395/425 |
| 5,210,749 | 5/1993 | Firoozmand et al. | 370/85.1 |
| 5,276,684 | 1/1994 | Pearson | 370/94.1 |
| 5,329,615 | 7/1994 | Malacarne et al. . | |
| 5,594,927 | 1/1997 | Lee et al. | 395/886 |
| 5,659,715 | 8/1997 | Wu et al. | 395/497.01 |
| 5,742,843 | 4/1998 | Koyanagi et al. | 395/800.14 |
| 5,748,806 | 5/1998 | Gates | 395/306 |

FOREIGN PATENT DOCUMENTS

| | | |
|---|---|---|
| 59072533 | 4/1984 | Japan . |
| 60178570 | 9/1985 | Japan . |
| 62115565 | 5/1987 | Japan . |
| 62267847 | 11/1987 | Japan . |
| 63116541 | 5/1988 | Japan . |
| 1219942 | 9/1989 | Japan . |
| 2101559 | 4/1990 | Japan . |
| 5173930 | 7/1993 | Japan . |
| 6019836 | 1/1994 | Japan . |
| 1537763 | 1/1979 | United Kingdom . |

OTHER PUBLICATIONS

IBM TDB v36 N2 Feb. 1993 pp. 131–133 Kravitz, J.K. et al, High Performance DMA Controller/CPU Interface Mechansim.

IBM TDB v35 N6 Nov. 1992 pp. 469–472 Eijan, U.G. et al, Direct Memory Access Queue Mechanism for Sharing a Single Direct Memory Access Channel for Multiple Processor with Common Data Memory.

Anonymous, Overlapped PIO Operations Research Disclosure n309 Jan. 1990 Document No. AAA90A063466 Order 90A 63466.

Irwin, J.W., Two–level DMA from Channels to Main Store IBM TDB n12 May 1990 pp. 358–359.

Edrington, J.D. et al, Dynamic Selection of DMA or PIO for Best Performance IBM TDB n2 Jul. 1990 pp. 305–306.

*Primary Examiner*—Frank J. Asta
*Assistant Examiner*—Thong Vu
*Attorney, Agent, or Firm*—Shelley M Beckstrand

[57] ABSTRACT

A digital parallel processing system wherein a plurality of nodes communicate via messages sent over an interconnection network. Messages are maintained in strict chronological order even though sent by nodes where several sources are generating messages simultaneously. A network adapter is described for interconnecting the processor and its associated memory to a network over a bus. The adapter includes an adapter associated memory programmable into a plurality of functional areas, said functional areas including a send FIFO for storing and forwarding messages to said network from said processor; a stack list for queueing in strict message order activation commands for said send FIFO; and an adapter program area for storing adapter program instructions which control the storing of messages to said send FIFO; and control means responsive to said stack list for executing said adapter program instructions in said strict message order without processor intervention.

16 Claims, 10 Drawing Sheets

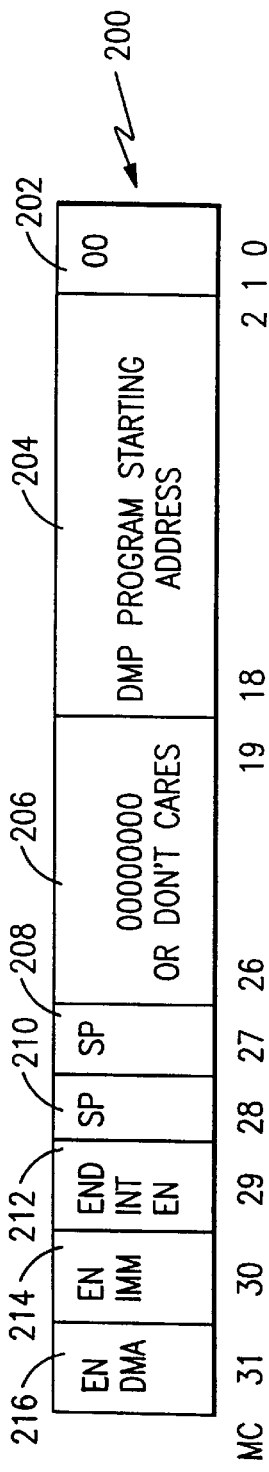

FIG.2

BIT 31 – DMA ENABLED (PROGRAM VALID) = 1
BIT 30 – IMMEDIATE DMP ENABLED (PROGRAM VALID) = 1
BIT 29 – INTERRUPT WHEN DMP PROGRAM IS COMPLETE = 1
BITS 28,27 – SPARES
BITS 26 TO 19 – DON'T CARES
BIT 18 TO 0 – DMP PROGRAM STARTING ADDRESS (ADDRESS SHOWN IS 4-BYTE ALIGNED, WHICH MEANS A DMP CAN ONLY START ON WORD BOUNDARIES).

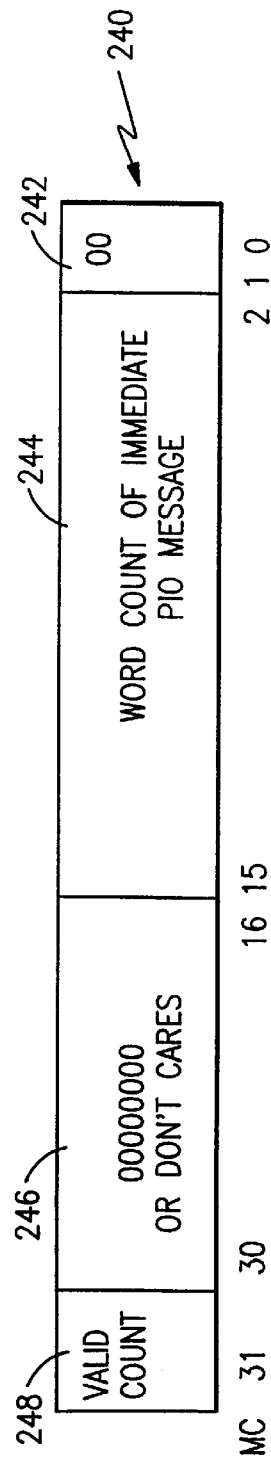

FIG.4

BIT 31 – DMP PROGRAM ENABLED (PROGRAM VALID) = 1
BIT 30 TO 16 – DON'T CARES (NOT USED)
BIT 15 TO 0 – WORD COUNT OF IMMEDIATE PIO MESSAGE, 4-BYTE ALIGNED, WHICH MEANS A MESSAGE MUST BEGIN AND END ON WORD BOUNDARIES).

METHOD AND APPARATUS FOR MAINTAINING MESSAGE ORDER IN MULTI-USER FIFO STACKS

BACKGROUND OF THE INVENTION

1. Technical Field

This invention relates to digital parallel processing systems, wherein a plurality of nodes communicate via messages sent over an interconnection network. In particular, this invention handles and keeps in chronological order the messages sent by each node when several sources are generating messages simultaneously.

2. Descriprion of the Prior Art

Known in the art is the use of network adapters for interfacing each node in a parallel system to a communication network. Such network adapters normally implement message buffers, usually a send First In First Out (FIFO) stack or buffer containing a plurality of messages to be sent to the network, and a receive (RCV) FIFO containing a plurality of messages which have been received from the network. The send FIFO stores and forwards messages to the network. The problem with this prior art scheme occurs when messages stored to the send FIFO can be generated from several sources, such as hardware controlled Direct Memory Access (DMA) operations and software controlled direct writes to the send FIFO using Programmed Input/ Output (PIO) instructions to transfer data from processor registers directly into the FIFO. The problem is in regards to keeping the messages in order, as most parallel message passing systems require in-order message delivery, while maintaining DMA efficiency; that is, the purpose of DMA operations is to provide higher performance by enabling the processor and DMA channel to function simultaneously in an over-lapped manner. The two requirements of keeping message order and maintaining DMA efficiency are in direct conflict with each other. Typical solutions provide either message order or DMA efficiency, but not both. That is, efficient DMA message systems have been devised without message ordering, and message ordering systems have been implemented without supporting simultaneous overlapped DMA operations.

However, if solving the message ordering problem defeats the overlapped capability of DMA, it is not a solution at all—yet that is the typical approach. That is, the conventional way of keeping the messages in order is to defeat the overlap capability. This involves commanding one DMA operation at a time from the processor and requiring an interrupt when the DMA write to the send FIFO has completed. In response to the interrupt, processor software would then decide which message to write to the FIFO next—another DMA message or a PIO message. In this way, the software would directly control keeping the messages in order. However, because the processor must control the message ordering on a real time basis, this leads to a large loss of processing power. This additional processing slows the message handling and takes away much of the capabiltiy to do calculations in parallel with the DMA operations.

The concept of using a DMA controller to increase data transfer performance and to off-load the data transfer task from being performed under the direct control of a processor is known in the art. In one such solution, a DMA channel is implemented in hardware comprising channel registers for storing transfer parameters (address and byte count), registers for storing control parameters (status and command), a data assembler circuit for converting serial input/output (I/O) data to parallel memory data, and a channel control circuit that controls the registers and assembler. This approach requires continuous interaction between the processor and the DMA controller, such that one DMA operation at a time is commanded from the processor. When the DMA transfer is complete, the processor receives an interrupt to inform it that it can command another DMA operation. This type of interactive processing defeats much of the potential performance advantage gained by the use of the DMA controller.

Several improvements have been made on the basic DMA technique described above without really changing the most important one-at-a-time interactive approach. In one such improvement, processor and DMA access to memory are interleaved more efficiently using a processor unit containing a DMA controller having concurrent operation with the processor by dividing address and data into two parts.

In a major improvement, a DMA controller is operated to scatter or gather data into different areas of memory in a single operation. This is accomplished by using a buffer descriptor list (BDL) stored in a FIFO at the DMA controller, the BDL containing a plurality of buffer descriptor words (BDWs)—one for each part of the scatter/gather operation. The BDWs contain a memory address from where the data is to be accessed plus a byte count to define the length of the transfer. The local processor can preload the BDL with BDWs whenever the BDL has an available location, and these processor loads can be overlapped with the DMA operation. This approach works well for disk and tape units that deal with strictly DMA transfer-type operations. However, a more flexible approach is required for message transfer over an interconnection network in order to keep messages flowing at the highest possible performance over the network while providing for handling a mixture of message types, such as the DMA transfer of long messages intermixed with short messages sent directly from the processor without using the DMA function. Also, and of most importance, is the need to provide for mixing messages from different sources while at the same time maintaining the correct order of delivery of the messages. For message passing systems it is usually a requirement that messages be delivered in strict order or a system malfunction will occur.

In yet another improvement, the one-at-a-time interactive approach is avoided by using queue FIFOs which are similar to buffer descriptor lists (BDLs). In this technique, the DMA operation is partitioned into two queue FIFOS. First, a work FIFO contains a list DMAs to be done (same as BDLs). And second, a completion FIFO lists the BDWs for DMAs that have been completed. In this system, the processor can read the completion FIFO to determine which DMAs have completed. This is a twist on keeping track of which DMAs have completed. Another such twist provides a DMA priority contention scheme amongst multiple devices on the same bus.

Finally, in still another approach known in the art, both send and receive data FIFOs are implemented as part of an intelligent I/O processor for the purpose of DMA transferring data in either direction between global memory and the FIFOs.

However, none of the above solutions known in the art intermix DMA and processor and other generated messages while at the same time retaining message order and accommodating a mixture of message types essential for optimum performance in an interconnection network.

The present invention solves these problems by using a unique method and hardware apparatus at the network adapter. The solution both increases overlapped processing efficiency, while at the same time maintaining message order and relieving the software of this burden.

SUMMARY OF THE INVENTION

A network adapter is provided for interconnecting a processor and its associated memory to a network over a bus. The adapter includes an adapter associated memory programmable into a plurality of functional areas, said functional areas including a send FIFO for storing and forwarding messages to said network from said processor; a stack list for queueing in strict message order activation commands for said send FIFO; an adapter program area for storing adapter program instructions which control the storing of messages to said send FIFO; and control means responsive to said stack list for executing said adapter program instructions in said strict message order without processor intervention.

BRIEF DESCRIPTION OF THE DRAWINGS

FIG. 2 is a block diagram showing the format of a send DMP pointer, a plurality of which comprise a stacked list.

FIG. 4 is a block diagram showing the format of a send immediate DMP control word.

DESCRIPTION OF THE PREFERRED EMBODIMENT

Figure 1:
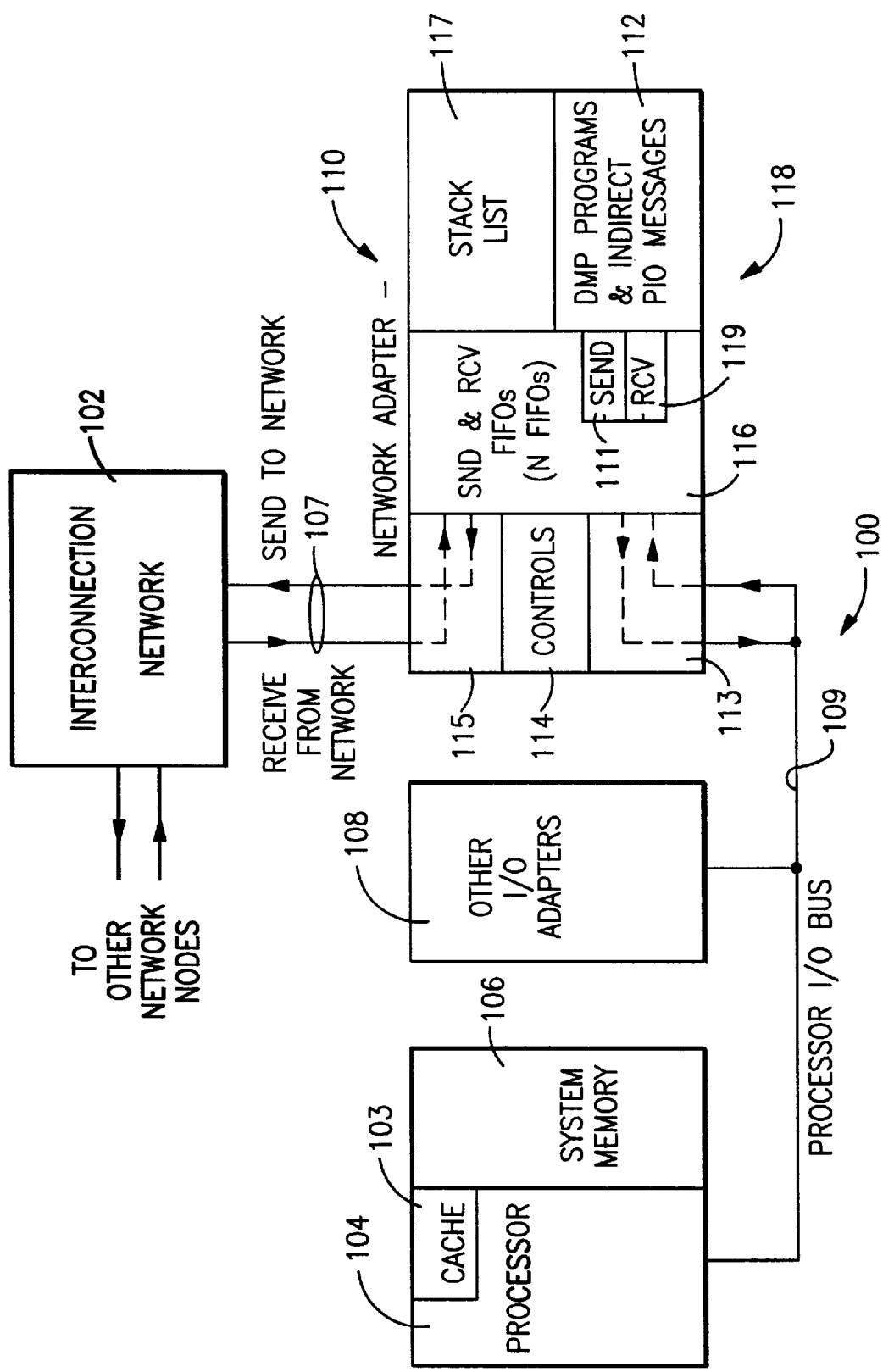
FIG. 1 is a diagram of a typical digital network showing the interconnection of a network node to the network and the components of the network node according to the preferred embodiment of this invention.

The invention comprises two major elements which work together to improve the performance of parallel systems using direct memory access (DMA) operations and requiring ordered message delivery. These elements are (1) stacked DMA writes to the send FIFO, and (2) indirect PIO processor message write commands to the same send FIFO.

Stacked DMA writes permit the processor to stack numerous pending DMA operations at the network adapter, and represent the first major element of the invention. The adapter executes them in order, and frees the processor to continue. This network adapter is programmable to interrupt the processor or not when it completes a specific DMA operation. A standard method for commanding the network adapter to perform a DMA operation is used in connection with the invention, which is to send a small DMA program (DMP) to the network adapter followed by a command to execute the DMP. The DMP contains information about a specific DMA operation to be performed, including the starting address of where DMA data is to be fetched from system memory, the word count of the DMA transfer, the FIFO number where the DMA data is to be placed in the network adapter, and control information such as the data transfer direction. The processor first writes one or multiple DMP's to specific addresses in adapter memory that have been reserved for DMP's. The size of the memory reserved for DMP's is variable and, in this preferred embodiment, is specified by the processor during intialization. This size depends on how many DMP's the processor must store at any given time. The storing of DMP's is done at any time prior to issuing the DMP start command, and a DMP can be reused as many times as desired without being restored from the processor. To execute a prestored DMP, the processor writes a DMP start command to the send DMA stack specifying the starting address in adapter memory of the DMP it wants to execute, and the adapter executes the DMP's in strict order. The adapter hardware contains a stacked list of pending send DMA's in adapter memory. This stack also functions as a FIFO to queue DMP starting commands. Send DMP's are activated by the command at the top of the list (queue) and processed one at a time; they are kept in order by the FIFO queued list. The stacked list can contain from 1 to L DMP start commands, where the DMP start command is basically a pointer to a prestored DMP in adapter memory.

Indirect programmed input/output (PIO) processor message write commands to the same send FIFO represent the second key element of the invention. The basic stacked lists provide the ordering capability amongst DMA operations. However, a further ordering problem arises when both DMA messages and processor PIO messages (messages written directly to the send FIFO and which bypass the stacked lists) are being intermixed to the same send FIFO. The problem occurs if the processor has stacked DMA operations to be processed in order, less than all of these have been passed to the FIFO, and then the processor writes a PIO message directly to the same FIFO intending that it be executed after all stacked DMA operations. In this instance, the PIO message is written to the FIFO out of order. If the processor wanted the PIO message stored after the last stacked DMA operation, instead of randomly, an out of order error is caused.

In accordance with this invention, this out-of-order error is avoided by using indirect PIO message write commands. These give the software the option of keeping the PIO messages in order by sending them through the same stacked list of start commands in the adapter used to start DMP's. Thus, PIO messages and DMA messages can be started by the same stacked list. This is accomplished by first storing a PIO message temporarily into adapter memory and thereafter writing a PIO start command to the stacked list that will be executed in strict chronological order. Thus, both PIO and DMA start commands are maintained in the same stacked list. The adapter inserts the PIO message into the send FIFO in order by executing an indirect PIO start command when its start command reaches the top of the stacked list. The PIO message goes indirectly from temporary adapter memory into the send FIFO under the control of the adapter.

An indirect PIO message is created by the processor storing a PIO message to temporary adapter memory by adding one control word in front of the normal PIO message. The word added contains the word count of the PIO message to be stored and the high order bit is set to indicate that this an indirect PIO. An indirect PIO comprises the first control word and the PIO message data, which is added to the send FIFO, the amount of such data being equal to the word count in the control word. The processor then stores the control word followed by data as an indirect PIO operation to temporary memory locations in the adapter memory, and not to the FIFO directly. Next the processor activates the indirect PIO operation by writing an indirect PIO start command to the stacked list. The indirect PIO start command points to the location in adapter memory where the indirect PIO is temporarily stored. The hardware in the network adapter adds this command at the bottom of the stacked list, and executes it in order along with other PIO and DMA messages in that list, when it reaches the top of the list. This keeps the PIO messages in order, instead of directly storing them to the send FIFO. The hardware executes the indirect PIO by moving the amount of data specified by the control word preceding the PIO message. The control word is destroyed after being used and is not stored to the send FIFO. Thus, PIO's and DMA's can be intermixed in any manner in the stacked list, and the hardware maintains message order without stalling or delaying the processor.

Referring to FIG. 1, a typical network node 100 implementing the invention is shown, including a processor 104, a processor I/O bus 109, and a network adapter 110. Node 100 attaches to one port of interconnection network 102 over full duplex bus 115, and includes network adapter 110. Adapter 110 includes adapter memory 118, which provides stacked list 117, DMP programs & indirect PIO messages 12, adapter FIFOs 116 including send FIFOs 111 and receive FIFOs 119, adapter registers 113 and 115, for attachment to and processor I/O bus 109 and network bus 107, respectively, and controls 114. Processor 104 interfaces directly to on-chip cache 103, system memory 106, and other I/O adapters 108 interface processor I/O bus 109.

In operation, network adapter 110 converts processor I/O bus 109 for communication to network 102. Processor 104 sends commands over I/O bus 109 to control network adapter 110, writes messages to send FIFO 111, and reads messages from receive FIFO 119. In addition, network adapter 110 is a bus master in that it can be commanded to read or write messages from and to system memory 106 using DMA operations. In accordance with this embodiment of the invention, DMA messages are read from system memory 106, over processor I/O bus 109 and stored in send FIFO 111. Herein, send FIFO 111 is located in adapter memory 118, which is part of network adapter 110.

Network adapter 110 can function as a slave or master on processor I/O bus 109.

As a slave, network adapter 110 responds to processor I/O commands (PIOs) issued directly by processor 104 software. PIO commands are capable of reading or writing adapter memory 118, adapter registers 113 and 115 and adapter FIFOs 116. Network adapter 110 differentiates which entity 113, 115 and 118 is to be read or written based on the address to which the PIO command is issued.

As a master, network adapter 110 arbitrates use of processor I/O bus 109. When acknowledged, adapter 110 owns bus 109 for a period of time and, for that period, can use bus 109 to read or write system memory 106 directly without interference with the execution of instructions in processor 104, which are usually executed from cache 103. This method of data transfer directly to/from system memory 106 is referred to as Direct Memory Access (DMA).

Network adapter 110, to be truly bi-directional with respect to network 102, attaches thereto via bi-directional bus 107, which includes at least one interface 115 for sending messages to the network, and at least one for receiving messages from the network. Messages sent by node 100 to network 102 are either transferred directly from processor 104 using PIO commands or by DMA directly from system memory 106 under control of network adapter 110. In either case, all messages to be sent to network 102 are routed over processor I/O bus 109 to network adapter 110, where they are directed through control logic 114 and stored temporarily into send FIFO 111. Control logic 115 then reads the message from send FIFO 111, and sends it to network 102 over bus 107. Network adapter 110 also supports the reverse operation, where messages arriving into network adapter 110 from network 102 are routed by control logic 114 to RCV FIFO 119. The message is temporarily stored in RCV FIFO 119 until a DMA operation is initiated at network adapter 110 to transfer the message over processor I/O bus 109 to system memory 106.

For send operations, each DMP is started by commands referred to as send DMP pointers, which point to a starting address in adapter memory 118 of the DMP program 112 to be executed. The send DMP pointer list 117 is a separate FIFO from send/receive FIFOs 116 for queueing DMP starting commands. Send DMPs 112 are processed one at a time and kept in order by pointer list 117. Pointer list 117 contains from one to L (say, 64) send DMP pointers, each pointing to a DMP 112 that has been commanded to be executed. Processor 104 software activates a send DMP 112 by writing a send DMP pointer to send DMP pointer list 117 in adapter memory 118.

Referring to FIG. 2, in connection with this embodiment, send DMP pointer 200 contains starting address fields 202, 204 of a prestored DMP program 112, and controls including word boundary address alignment field 202; a don't care field 206; spare bits 208 and 210; bit 212 for indicating, when on, an interrupt upon DMP program completion; bit 214 indicating, when on, immediate DMP enabled (program valid); and bit 216 indicating, when on, DMA enabled (program valid).

Figures 3, 3B:
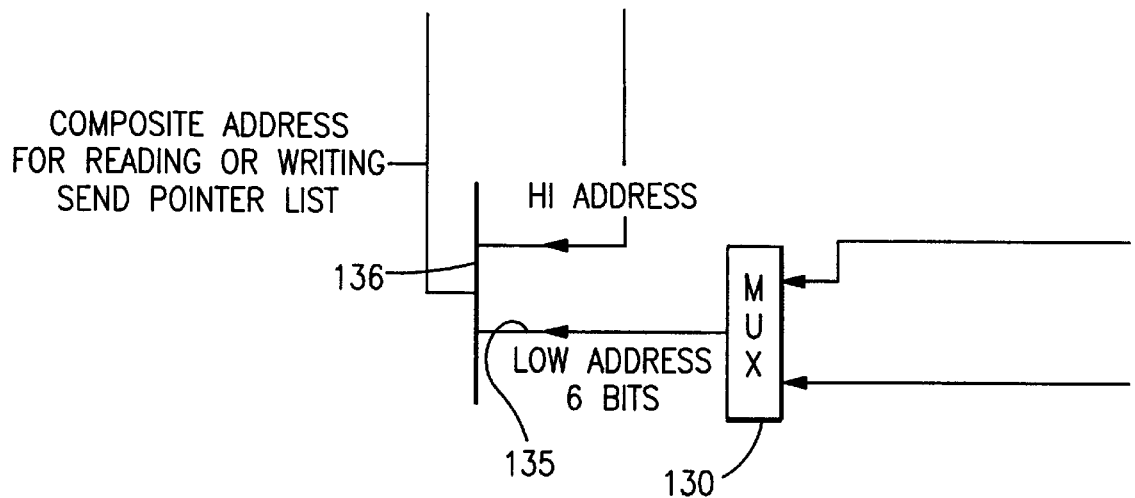
FIGS. 3A, 3B, 3C and 3D, arranged as shown in FIG. 3, are a block diagram showing stacked lists and how they are used to point to indirect PIO messages according to this invention.
Figure 3A:
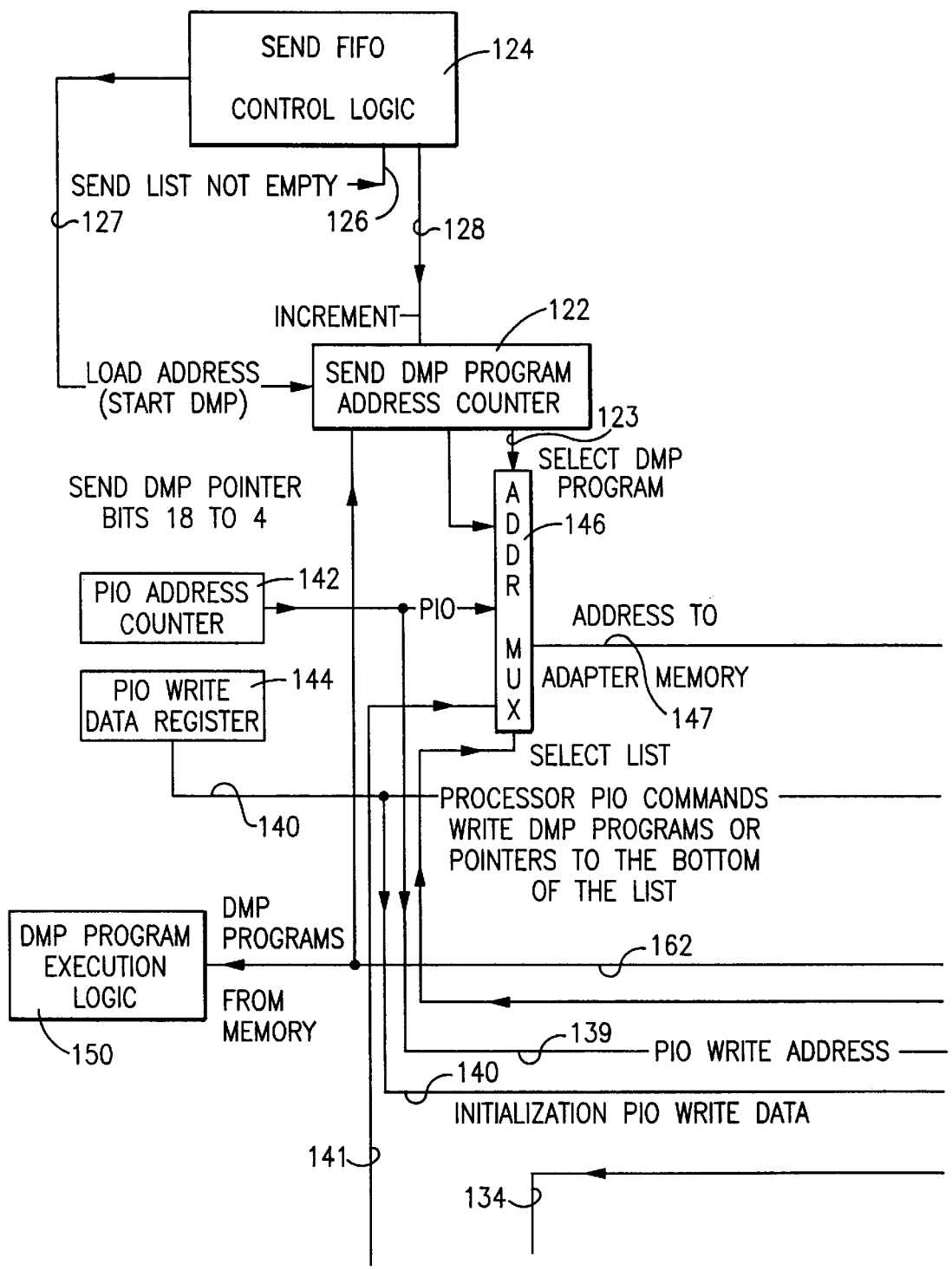
Figure 3C:
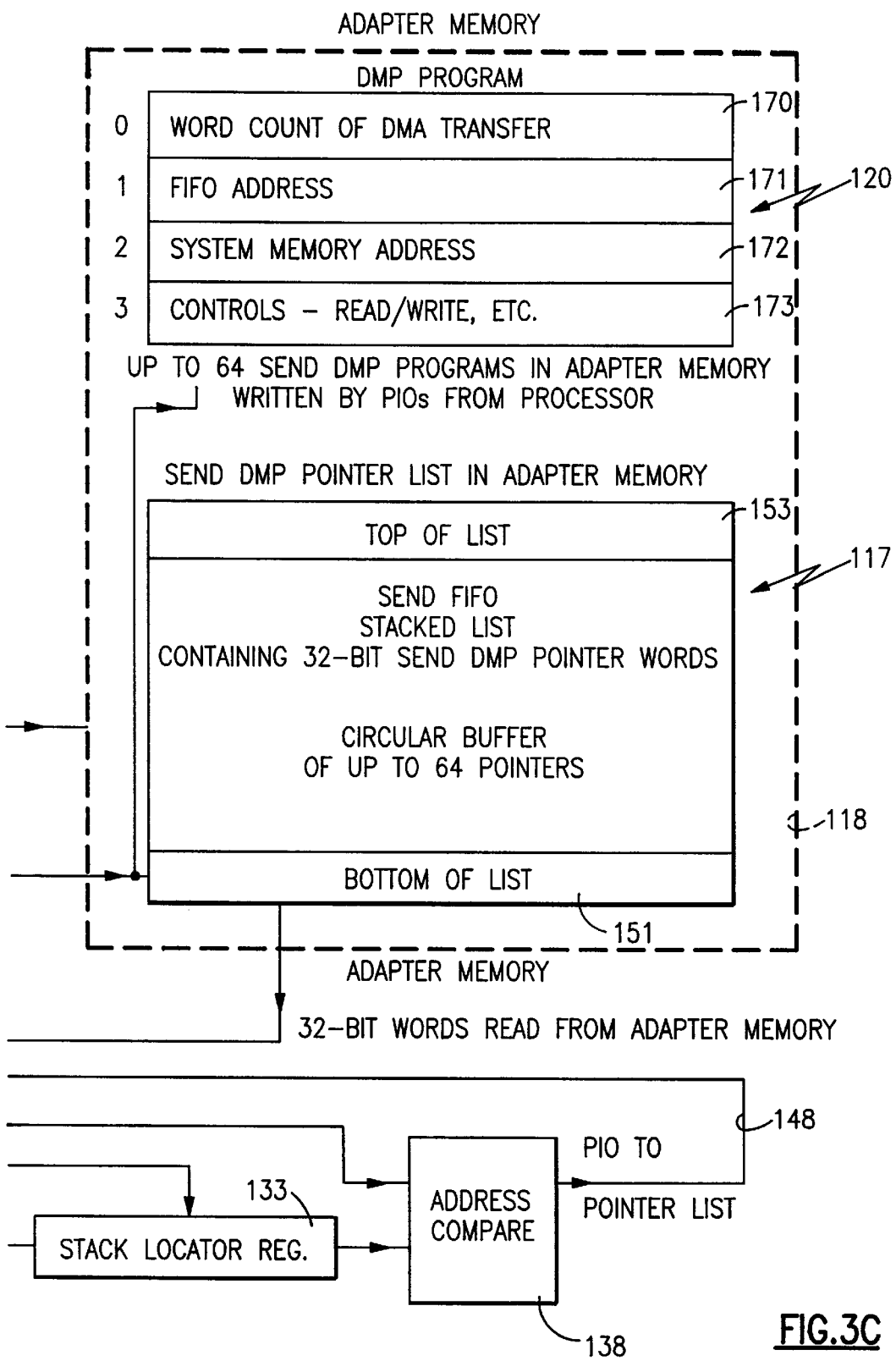
Figure 3D:
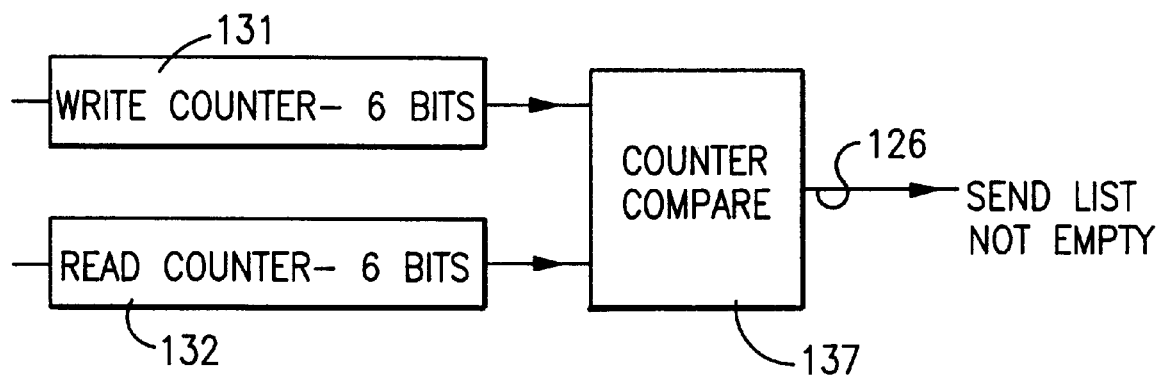

Referring to FIG. 3, a description will be given of adapter 110, including a description of stack lists 117 and controls 114 (FIG. 1) used to point to indirect PIO messages 112 (FIG. 1) in accordance with this embodiment of the invention.

Adapter memory 118 includes a plurality of DMP programs 120 in DMP programs & indirect PIO messages area 112, and send DMP pointer list 117. DMP program 120 includes four fields, including word count of DMA transfer 170, FIFO address 171, system memory address 172, and read/write and other controls 173. For purpose of this embodiment, by way of example, up to sixty four such DMP programs 120 can be written in area 112 of adapter memory 118 by PIOs from processor 104. Send DMP pointer list 117 in adapter memory 118 is a FIFO stack list, or circular buffer, of up to sixty four 32-bit send DMP pointer words 200 (FIG. 2).

Send FIFO control logic 124, part of controls 114, responsive to a send list not empty control bit 126 indicating that send list 117 is not empty, provides start DMP load address 127 and increment 128 signals to send DMP program address counter 122. Send DMP program address counter 122 provides a select DMP program signal 123 to address multiplexor 146, which provides on its output 147 an address to adapter memory 118. PIO address counter 142 provides, as is represented by line 139, a PIO address to address multiplexor 146 and a PIO write address to address compare 138. PIO write data register 144 provides processor PIO commands over data bus 140 for writing DMP programs 120 or pointers to the bottom of DMP pointer list 117, and for initializing PIO write data to stack locator register 133. Data accessed from adapter memory 118, as is represented by line 162, provides 32-bit pointer words read from pointer list 117 or DMP programs 120 to DMP program execution logic 150 and send DMP program address counter 122. Composite address 141 for reading or writing from/to send pointer list 117 is assembled by concatenating hardware 136 from high address bus 134 and low address bus 135, and fed to address multiplexor 146. Stack locator register 133 outputs are fed to hi address bus 134 and address compare 138, which provides on its output 148 a PIO to pointer list signal to the select list input of address multiplexor 146. Write counter 131 and read counter 132 registers are multiplexed at block 130 to form the low order address bits 135, and are fed to counter compare 137, which generates and provides the send list not empty signal 126 input to send FIFO control logic 124.

In operation, the apparatus of FIG. 3 implements in network adapter 110 a pointer list as a 64-word circular buffer 117. Circular buffer 117 is controlled by two six bit counters, read counter 132 and write counter 131. These counters 131, 132 are initialized to all zeroes, so that when the first send DMP pointer 200 is written to list 117 at, say, location 00h, write counter 131 is incremented to 01h. Write counter 131 is incremented after each pointer 200 is stored to list 117, so it always points to the tail, or bottom 151 of that list and defines the address 147 where the next pointer 200 is to be written to list 117. Read counter 132 remains at 00h until the DMP 120 in list 117 pointed to by field 204 (FIG. 2) has been executed, then it is moved to 01h. Thus, as read counter 132 is incremented after the DMP program 120 to which its present address 147 points (that is, indirectly points by way of field 204 in the pointer 200 in stack 117 at the location addressed in adapter memory by address 147, which in turn is derived from read counter 132) is executed successfully, it (read counter 132) always points to the top, or head 153, of send DMP pointer list 117. In this manner, read counter 132 initally defines the address of the next pointer 200 to be processed in stack list 117, and during the execution it defines the address of the pointer in stack list 117 to the DMP program 120 that is presently being executed.

Read counter 132 and write counter 131 feed comparator 137 to detect whether their contents are equal or not. Upon detecting that counters 131 and 132 are not equal, comparator 137 informs send FIFO control logic 124 that list 117 is not empty, but that a send DMP pointer 200 is pending. This causes send FIFO control logic 124 to process the next send DMP pointer 200, if no previous send message operation is active at network adapter 110.

Referring further to FIG. 3, the apparatus of the invention operates to activate send DMP programs 120. Circular buffer 117, which in this embodiment uses sixty four locations of adapter memory 118, contains a list of send DMP pointers 200 pointing (by way of DMP program starting address 204) to DMP programs 120 that have been activated for execution. Thus, processor 104 can activate up to sixty four list 117 entries and have them held pending in the FIFO order determined by the sequence of their storage to the list.

Execution of a DMP program 120 starts with processor 104 sending one or many DMP programs 120 to adapter memory 118 over processor I/O bus 109 and thence to network adapter 110, as shown in FIG. 1. Processor 104 has direct access to write all adapter memory 118, incuding send DMP pointers 200 in send pointer lister 117, and send DMP programs 120, via PIO operations. PIO writes are not DMAs, but come directly from processor 104 registers (not shown) when processor 104 executes an I/O write instruction (one of the many instructions that state-of-the-art processors are capable of executing.) A PIO operation includes address and data information. The address defines the device, register, adapter, memory location, or list that is to be written; while the data defines the information to be written at the selected address. The base address of where in adapter memory 118 the pointer list 117 is located is programmable by processor 104 via PIO writes. Stack locator, or base address register 133 points to the location in adapter memory 118 of the base of pointer list 117 and is loaded in adapter 110 hardware by processor 104 software before activating any DMP program 120 or writing any DMP pointer 200 to stack list 117. Register 133, when addressed by PIO address counter register 142, is loaded from register 144 over data lines 140. Register 133 is usually loaded during initialization of network adapter 110, and once initialized will define the specific sixty four locations in adapter memory 118 which will be used for stack list 117. Thus, the location of stack list 117 in adapter memory 118 is selectable and controlled by the processor 104 software. The path that processor 104 uses to write to register 133 is over I/O bus 109 to network adapter 110. At network adapter 110, address and data sent by a PIO write is stored in registers 142 and 144, respectively. If register 142 addresses the stack locator register 133, the value stored in register 144 is moved over data bus 140 to register 133, thereby initializaing register 133 and defining the programmable base address of stack list 117 in adapter memory 118.

After initialization, adapter 110 is ready to receive PIO writes of write DMP programs 120 into adapter memory 118 at location 112 (FIG. 1; a single such DMP program 120 is shown in FIG. 3.) Such DMP programs 120 can be written anywhere in adapter memory 118, except to the areas of adapter memory 118 that have been assigned to stack list 117, send FIFO 111, or receive FIFO 119. A PIO write command is used to store each word 170, 171, 172 and 173 of DMP program 120, one word at a time, through registers 142 and 144. To write DMP programs 120 into adapter memory 118 at location 112, register 142 supplies the address of the adapter memory 118 location to be written directly through multiplexor 146 to memory 118, while register 144 supplies data over data bus 140 directly to adapter memory 118 to write DMP programs 120. Whether bus 140 contains DMP programs 120 or send DMA pointers 200 is determined by whether or not the address in register 142 is equal or not to the address in register 133, as hereinafter described. After a DMP program 120 has been written to adapter memory 118 area 112, it can be started at anytime by writing the DMP's starting address 204 to stack list 117 in a send DMP pointer 200 using a PIO write operation.

Network adapter 110 examines the address of every PIO write operation to determine if it is for the stack list 117 or not by comparing in address compare logic 138 the address issued by the PIO write and stored into register 142 to the address in stack locator register 133. If the two address 142 and 133 compare equal, concatenating hardware 136 takes the high order base address bits 134 from stack locator register 133 and replaces the low order six address bits coming from register 133 with the six low-order bits 135 from write counter 131. This way, the hardware keeps track of the location of the tail 151 of stack list 117, and the software need only point to the base address of stack area 117, which has all six low order address bits equal to zero. This relieves the software of the task of keeping track of which stack list 117 location to write next. Likewise, a read of stack list 117 is performed in response to an address 141, 147 that is concatenated at 136 from read counter 132 and register 133 over address lines 134 and 135, respectively. Register 133 locates the base area in memory 118 where stack list 117 is located, and read counter 132 selects the exact (one of sixty four) location to be read. When writing to stack list 117, processor 104 sends an address to address counter 142 equal to the base address held in stack locator register 133 to command the write of a send DMP pointer 200 to send DMP pointer list 117.

The processing of stack list 117 starts and proceeds automatically under hardware control of send FIFO control logic 124. Whenever stack list 117 is not empty, read counter 132 is not equal to write counter 131, and send list not empty signal 126 is on. Responsive thereto, send FIFO control logic 124 first reads the address pointed to by the read counter 132 to fetch the send DMP pointer 200 from adapter memory 118 list 117. This equates to using indirect addressing to find the DMP program 120 to be executed. Send FIFO control logic 124 concatenates the address of the next send DMP pointer 120 in adapter memory 118 by forming address 136 from the base address stored in register 133 over bus 134 and the six low order bits from read counter 132 over bus 135. The composite address 141 is sent through multiplexor 146 to line 147 to address adapter memory 118, and fetch the head of stack list 117, the next send DMP pointer 200 to be executed. The send DMP pointer 200, one word formatted as shown in FIG. 2, is read from memory 118, sent over memory read bus 162, and stored in send DMP program address counter 122. Address counter 122 uses field 204, 202 (bits 18 to 0) of the send DMP pointer 200 it contains to find the beginning of the DMP program 120 in adapter memory 118. In this way, the hardware accesses and then executes the selected DMP program 120, only one at a time. Send DMP program 120 is fetched from adapter memory location 112, one word 170–173 at a time, by gating address counter 122 through multiplexor 146 to provide the address of the first word of the DMP program. Adapter memory 112 reads the addressed location, the first word 170 of DMP program 120, to memory read bus 162 for storage to DMP execution logic 150. Control logic 124 then increments address counter 122, and repeats the same operation to fetch the next three words 171–173 of DMP program 120 to execution logic 150. When all four words are fetched from DMP program 120, control logic 124 stops the fetching of DMP words and execution logic 150 executes the fetched DMP program. When the fetched DMP program completes successfully, read counter 132 is incremented by one word and the next send DMP program 120 addressed by field 204 in the next sequential entry in stack list 117 is executed, if stack list 117 is not empty. Because send DMP programs 120 are executed sequentially until send pointer list 117 is empty, processor overlap is facilitated because processor 104 merely stores a DMP program 120 (or uses a previously stored DMP program 120 over again), commands its execution by writing to the associated send pointer list 117, and then moves on to the next processor 104 task while send messages within a list are kept in order at all times.

Indirect immediate PIO message write commands are used to assure processing of PIO messages in order. Send pointer list 117 automatically causes overlapped processing and keeps DMA operations in order. However, a further ordering problem arises when both DMA messages and PIO messages are being stored and intermixed in send FIFO 111. The problem occurs if processor 104 has stacked DMA operations to be processed in order in stack list 117, and then writes a PIO message directly to send FIFO 111 before stack list 117 has completed all DMA's. The PIO message will, in that instance, be written to send FIFO 111 out of order. If processor 104 requires that a PIO message be kept in order and stored after the last stack list 117 DMA operation stored at that time, an out of order error is caused. As will be described hereafter in connection with FIGS. 4 and 5, by this invention, that error is avoided by use of the indirect immediate PIO message write command. In this manner, processor 104 software can choose to make the adding of the PIO message to send FIFO 111 a network adapter 110 controlled operation, for processing just like DMA's.

Referring to FIG. 4, send immediate DMP control word 240 includes word alignment field 242, word count field 244, don't care field 246 and valid count bit 248.

Figures 5, 5B:
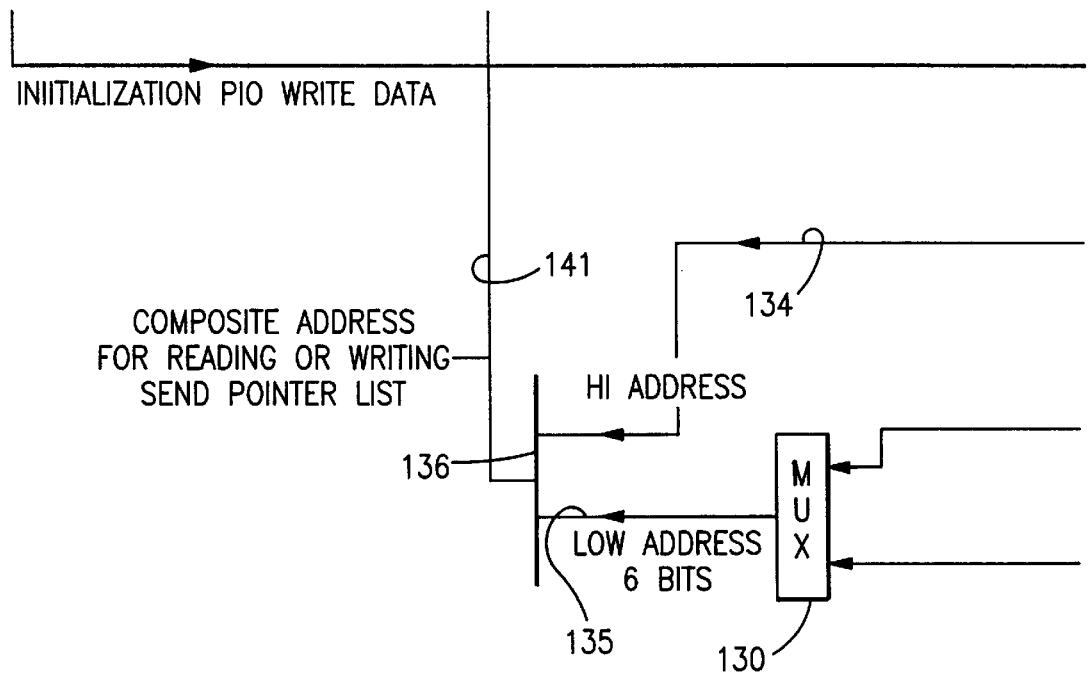
FIGS. 5A, 5B, 5C and 5D, arranged as shown in FIG. 5, are a block diagram illustrating stacked lists and send DMP processing, including the insertion of DMA and indirect PIO messages into the send FIFO according to this invention.
Figure 5A:
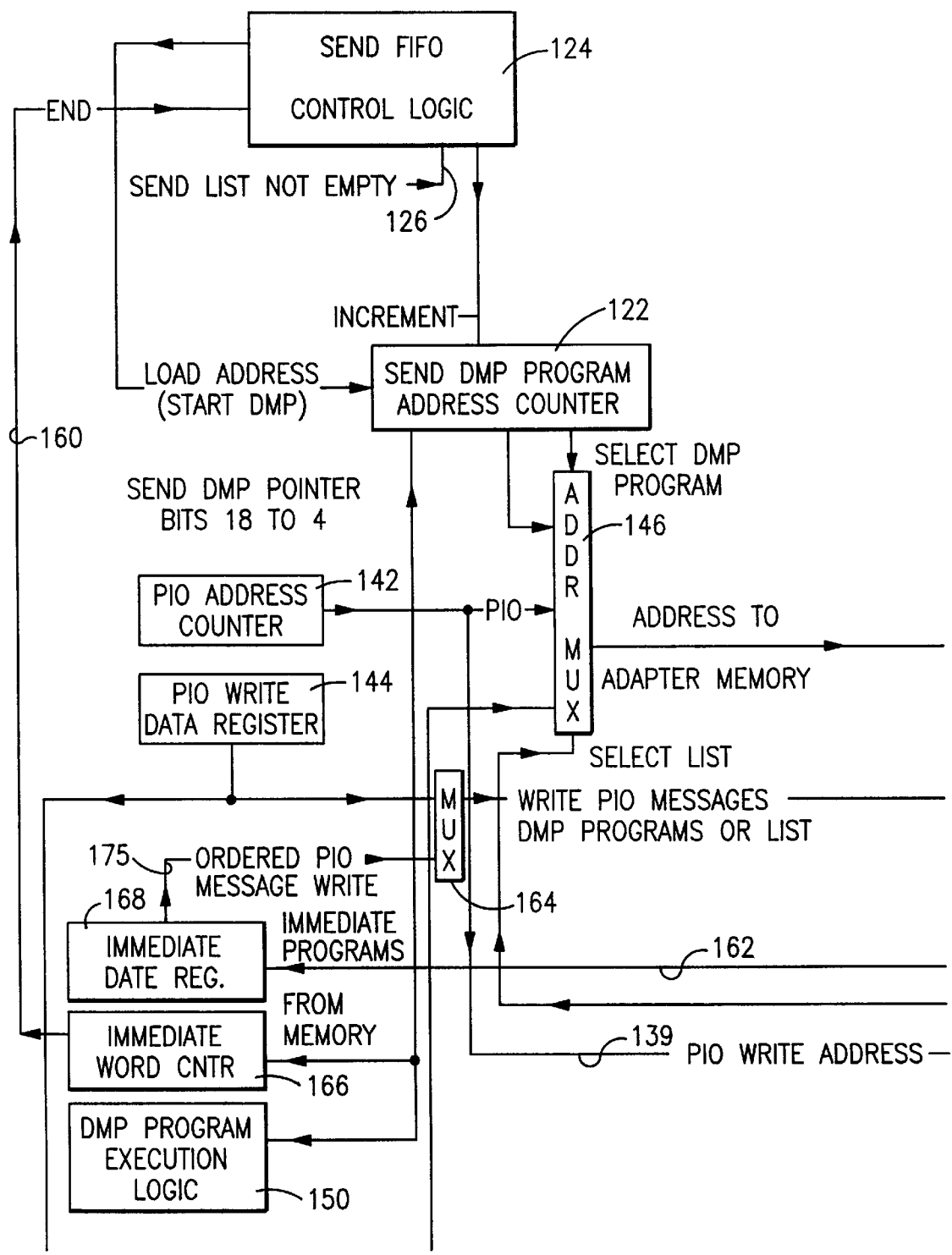
Figure 5C:
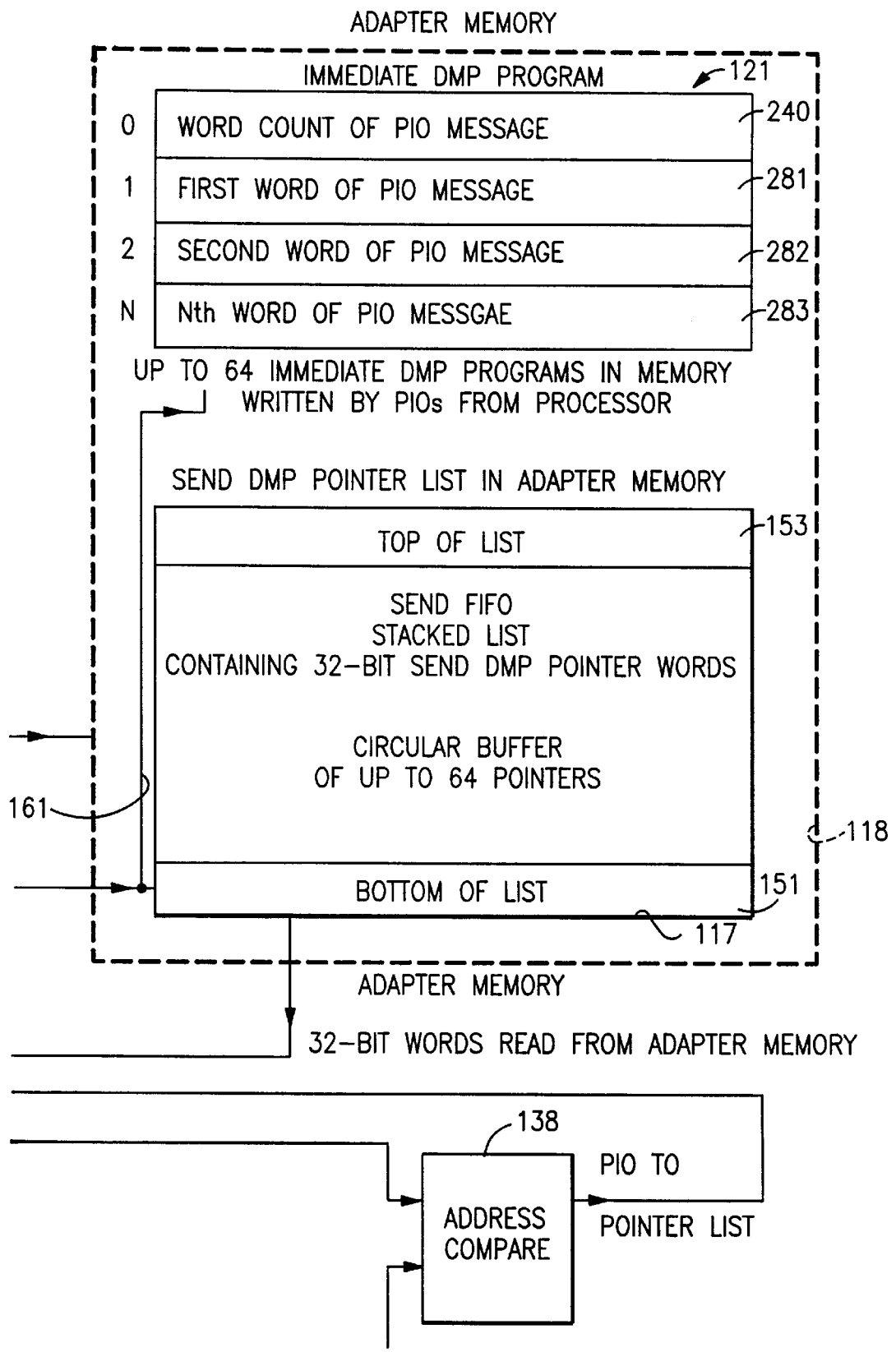
Figure 5D:
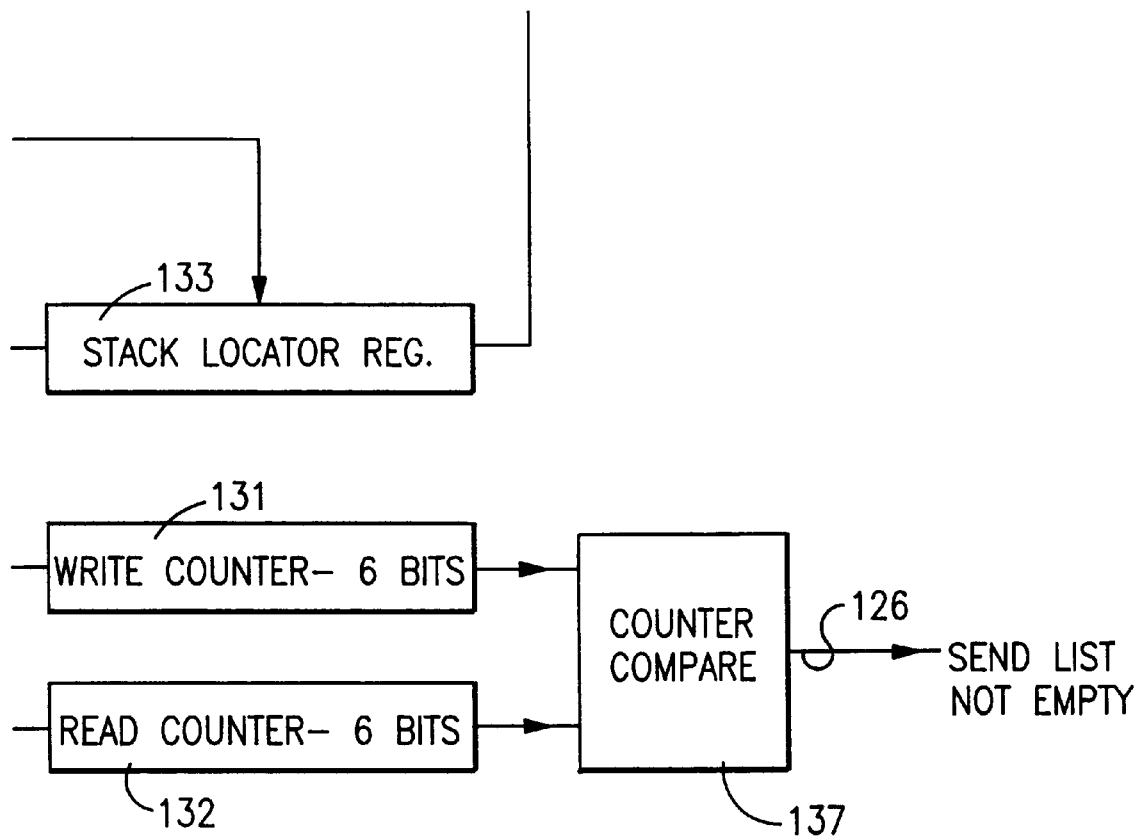

Referring to FIGS. 4 and 5, in this embodiment, network adapter 110 operates to maintain correct message order. This is accomplished as follows. Processor 104 software adds one control word 240 in front of the normal PIO message to make it into an immediate DMP program 121. The word added contains the word count 244 of the immediate message to be stored and the high order bit 248 is set to indicate that this program is valid. Field 246, bits 16 through 30, are undefined. Herein, by forcing bits 242 to zero, the word count of immediate PIO message is four bit aligned, which means a message 121 must begin and end on word boundaries. Thus, an immediate DMP program 121 contains the control word 240 of FIG. 4 followed by the PIO message, which is the data to be added directly to send FIFO 111, including the first through Nth words 281–283. The number of data words 240–283 added to send FIFO 111 is equal to the word count field 244 in control word 240. Processor 104 then stores the immediate DMP program 121 via a PIO write operation to adapter memory 112, just like it would store a normal DMP program 120, as explained in connection with FIG. 3. Next, processor 104 activates the DMP 121 by writing a send DMP pointer 200 to stack list 117 which points to the address in adapter memory 112 of the immediate DMP program 121. Send DMP pointer 200 (FIG. 2) is used to differentiate between a DMA or immediate program using control bits 30 and 31 in fields 214 and 216, respectively. Field 216 is set to indicate that the program is a normal DMP program, while field 214 is set to indicate an immediate DMP program. The settings of fields 214 and 216 are programmed to be mutually exclusive. Network adapter 110 adds this DMP pointer 200 at the bottom 151 of stacked list 117 of pending hardware operations using write counter 131, as previously described (FIG. 3). The storing of the pointer 200 to bottom 151 of stack list 117 causes the PIO message 240, 281–283 contained in the immediate DMP program 121 to be added in order to send FIFO 111. Immediate DMP program 121 is processed when its send DMP pointer 200 moves to the top 153 of stack list 117. Send FIFO control logic 124 initially fetches pointer 200 to the immediate DMP program 121 and accesses the program words 240, 281–283 in the same way as previously described with respect to fetching a normal send DMP pointer 200 and DMP program 120. Subsequent processing of the immediate DMP program will be described hereafter in connection with FIG. 5.

Referring to FIG. 5 in connection with FIG. 3, the hardware required for processing of an immediate DMP program 121 will be described. FIG. 5 is identical to FIG. 3, except for the following: immediate DMP program 121 is shown (but does not replace DMP program 120); and multiplexor 164, immediate data register 168 and immediate word counter 166 are added to the logic. Inputs to register 168 and counter 166 are from stack list 117; the output of immediate word counter 166 is fed as end signal 160 to send FIFO control logic 124, and of immediate data register 168 as ordered PIO message write signal 175 to multiplexor 164, the other input to which is the output of PIO write data register 144, and the output of which is write PIO message 161 to immediate DMP program 121 and send FIFO stacked list 117.

In operation, as previously noted, field 214 (bit 30) being set in send DMP pointer record 200 informs hardware control logic 124 that the record 200 being executed represents an immediate DMP program 121. In this case, control hardware 124 routes the first word 240 of the immediate DMP program, as it is fetched from the adapter memory 118 over bus 162, to immediate word counter 166, rather than to DMA execution logic 150. Thus, counter 166 contains the word count 244 of the message 121 being accessed from adapter memory 112. As the second 281 and each successive word 282–283 of immediate DMP program 121 are fetched from adapter memory 118, one word at a time, they are put sequentially into immediate data register 168. As each word is stored into register 168, word counter 166 is decremented by one word count (four bytes), and the address in counter 122, which is fetching the program, is incremented by one word count (four bytes.) Each word stored to register 168 is immediately routed through multiplexor 164 onto the write data bus 161 to adapter memory 118. The immediate data words 281–283 are immediately written back into adapter memory 118 one at a time, but they are written to a different area of adapter memory: send FIFO 111. (Word 240 is only stored to immediate word counter 166, not to adapter memory 118.) For simplicity, FIG. 5 does not show send FIFO 111, but FIG. 1 shows how send FIFO 111 is located in a different area of adapter memory 118. Thus, the immediate operation is basically a transfer of the PIO message 121 from one area of adapter memory, DMP programs and indirect PIO messages 112, to a different area, send FIFO 111. Data is added to send FIFO 111 in strict order using this method. The PIO message 121 is held temporarily in message area 112 until it can be transferred to its correct destination, send FIFO 111, in strict order.

The immediate operation continues one word at a time until the immediate word counter 166 decrements to zero. This signifies the end of the immediate data. After the last word 283 is successfully written to send FIFO 111, end signal 160 is sent from counter 166 to control logic 124 to terminate the operation. Then read counter 132 is incremented by one word and, as previously described, the next send DMP program 120 is accessed from stack list 117 and executed, if the stack is not empty. Send DMP types (normal 120 and immediate 121) can be intermixed in any manner, and are executed sequentially in proper order (back-to-back) while send list not empty signal 126 is true, signifying send pointer list 117 is not empty.

ADVANTAGES

The method and apparatus of the invention present an improved technique of ordering messages with respect to a nodal processor and an interconnection network which maintains Direct Memory Access (DMA) efficiency, enabling DMA operations to provide maximum performance advantage by executing in a fully overlapped manner in respect to the nodal processor.

ALTERNATIVE EMBODIMENTS

While the invention has been described with respect to preferred embodiments thereof, it will be apparent that the foregoing and further modifications and extensions may be made without departing from the spirit and scope of the invention.

We claim:

1. A network adapter for interconnecting a processor and its associated memory to a network over a bus for sending direct memory access (DMA) and immediate messages from said processor to said network under control of activation commands, comprising:

an adapter associated memory programmable into a plurality of functional areas, said functional areas including a send FIFO for storing and forwarding DMA and immediate messages to said network from said processor;

a stack list for ordering the sending of DMA and immediate messages to said send FIFO; and an adapter program area for storing adapter program instructions which control the storing of DMA messages from said processor's associated memory to said send FIFO and for storing immediate messages from said processor;

said processor being operable to store at least one of said DMA messages to its associated memory and to send an activation command to said stack list for each of said DMA messages, thereby commanding the network adapter to read in order said message from the processor's associated memory via direct memory access for sending said message to said send FIFO and network;

said processor being further operable to send at least one of said immediate messages to said adapter program store area and an activation command to said stack list for each of said immediate messages directly to the network adapter without storing said messages to its associated memory;

said activation commands for said DMA messages and said activation commands for said immediate messages being queued in strict order into said stack list; and a controller responsive to activation commands stored in said stack list for transferring immediate messages to send FIFO and for executing said adapter program instructions for transferring DMA messages to said send FIFO, whereby DMA and immediate messages are transferred to said send FIFO in said strict message order without processor intervention.

2. The network adapter of claim 1 wherein said controller, responsive to said adapter program instructions, executes direct memory access to memory associated with said processor to control the storing and forwarding of processor messages without processor intervention.

3. The network adapter of claim 1 wherein said controller is responsive to said adapter program instructions to control the storing and forwarding of said adapter program instructions to said send FIFO.

4. The network adapter of claim 1 wherein said controller fetches and executes said adapter program instructions sequentially in the order determined by said stack list.

5. The network adapter of claim 1 wherein said stack list contains a plurality of entries, each entry being a pointer to a plurality of adapter program instructions.

6. The network adapter of claim 5 wherein said controller executes processor commands received from said bus to add pointers to said stack list.

7. The network adapter of claim 6 wherein said stack list is a FIFO which orders entries by adding the most recently received entry to the bottom of said stack list.

8. The network adapter of claim 5 wherein said controller sequentially accesses pointers in said stack list, and responsive to said sequentially accessed pointers locates and executes the corresponding adapter program, and removes said accessed pointer from said stack list.

9. The network adapter of claim 8 wherein said stack list is a FIFO.

10. A network adapter for interconnecting a processor and its associated memory to a network over a bus for sending direct memory access (DMA) messages and immediate messages from said processor to said network under control of activation commands, comprising:

an adapter memory including a send buffer, a program store, an immediate message store, and a send pointer list;

said send buffer storing and forwarding said DMA and immediate messages in order to said network from said processor;

said program store storing direct memory access (DMA) programs for controlling the network adapter to read DMA messages from the processor's associated memory via direct memory access and to send DMA messages to said send buffer and network, and for storing and holding immediate DMA programs including immediate messages, until said messages are sent in order to said send buffer and network; and said send pointer list queuing activation commands;

said processor being operable to store at least one of said DMA messages to its associated memory and to send one of said activation commands to said pointer list for each of said DMA messages;

said processor being further operable to send at least one of said immediate messages over said bus directly to said program of said adapter memory and to send one of said activation commands to said pointer list for each of said immediate messages;

a plurality of activation commands for said DMA messages and said immediate messages being queued in strict order into said pointer list; and an adapter control responsive to said activation commands for transferring immediate messages to send buffer from said adapter program store and executing DMA programs for transferring DMA messages to said send buffer;

whereby said DMA and immediate messages transferred to said send buffer are in strict sequential order without processor intervention.

11. The network adapter of claim 10 wherein each of a plurality of said activation commands includes an address within said adapter memory of a corresponding DMA program.

12. The network adapter of claim 11 wherein each said plurality of activation commands further includes indicia identifying whether said DMA program is an immediate DMA program.

13. The network adapter of claim 12 wherein said adapter control is responsive to receipt of an immediate DMA program from said processor for adding a corresponding activation command to the bottom of said send pointer list.

14. Method for controlling the transfer of messages from a nodal processor and its associated memory through a network adapter to an interconnection network, said messages including direct memory access (DMA) messages and immediate messages being transferred under control of activation commands, comprising the steps of:

storing said DMA messages to said associated memory of said nodal processor;

storing said immediate messages in an adapter memory within said network adapter;

storing activation commands for said DMA and immediate messages in a send FIFO stacked list within said network adapter;

sequentially accessing said send FIFO stacked list to control the storing of said DMA and immediate messages to a send FIFO buffer; and transferring said DMA and immediate messages from said send FIFO buffer to said interconnection network in sequential order.

15. The method of claim 14 wherein said storing steps include storing messages in said program store in other than strict sequential order, and storing pointers in said stacked list in strict sequential order.

16. The method of claim 15 wherein said transferring step includes sequentially accessing said stacked list to address and transfer said messages to said send FIFO buffer.

* * * * *